United States Patent
Balk et al.

(10) Patent No.: US 7,593,515 B2
(45) Date of Patent: *Sep. 22, 2009

(54) SYSTEMS AND METHODS FOR PROVIDING UNIFIED COLLABORATION SYSTEMS WITH COMBINED COMMUNICATION LOG

(75) Inventors: Igor Balk, Brighton, MA (US); David Michael Choupak, Cupertino, CA (US)

(73) Assignee: Unison Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/247,934

(22) Filed: Oct. 8, 2008

(65) Prior Publication Data

US 2009/0041217 A1    Feb. 12, 2009

Related U.S. Application Data

(63) Continuation of application No. 11/749,642, filed on May 16, 2007.

(51) Int. Cl.
*H04M 11/00*    (2006.01)

(52) U.S. Cl. .................. 379/93.24; 379/90.01

(58) Field of Classification Search .............. 379/93.24, 379/93.01, 90.01, 93.09, 156
See application file for complete search history.

(56) References Cited

U.S. PATENT DOCUMENTS

| | | | |
|---|---|---|---|
| 1,479,442 A | 1/1924 | Adendorff | 379/111 |
| 3,221,107 A | 11/1965 | Seemann et al. | 179/18 |
| 3,479,465 A | 11/1969 | Masucci | 179/18 |
| 4,953,159 A | 8/1990 | Hayden et al. | 370/62 |
| 5,012,511 A | 4/1991 | Hanle et al. | 379/211 |
| 5,060,255 A | 10/1991 | Brown | 379/67 |
| 5,309,513 A | 5/1994 | Rose | 379/265.12 |
| 5,335,269 A | 8/1994 | Steinlicht | 379/266.05 |
| 5,515,428 A | 5/1996 | Sestak et al. | 379/266 |
| 5,557,667 A | 9/1996 | Bruno et al. | 379/201 |
| 5,647,002 A | 7/1997 | Brunson et al. | 380/49 |
| 5,654,961 A | 8/1997 | Araujo et al. | 370/263 |
| 5,696,809 A | 12/1997 | Voit | 379/5 |
| 5,740,237 A | 4/1998 | Malik et al. | 379/211 |
| 5,796,394 A | 8/1998 | Wicks et al. | 345/329 |
| 5,875,302 A | 2/1999 | Obhan | 395/200.55 |
| 6,069,949 A | 5/2000 | Schuenhoff et al. | 379/242 |

(Continued)

FOREIGN PATENT DOCUMENTS

EP    0 510 411 A2    10/1992

(Continued)

OTHER PUBLICATIONS

International Search Report for PCT/US2008/054731.

(Continued)

*Primary Examiner*—Stella L Woo
(74) *Attorney, Agent, or Firm*—Winston & Strawn LLP

(57) ABSTRACT

A communication system provides integrated email, telephone and instant messenger communication including a common address book, a common log of communication history and shared presence information. A user can respond to a communication according to any format, email, telephone or instant messenger, with a response using the same format or any other format. The response may be initiated by a single command.

8 Claims, 6 Drawing Sheets

U.S. PATENT DOCUMENTS

| | | |
|---|---|---|
| 6,192,048 B1 | 2/2001 | Nelson et al. .............. 370/380 |
| 6,208,658 B1 | 3/2001 | Pickett ..................... 370/401 |
| 6,212,268 B1 | 4/2001 | Nielsen .................... 379/209 |
| 6,285,752 B1 | 9/2001 | Rice ...................... 379/266.07 |
| 6,404,747 B1 | 6/2002 | Berry et al. ............... 370/270 |
| 6,438,222 B1 | 8/2002 | Burg ..................... 379/215.01 |
| 6,442,268 B1 | 8/2002 | Klaghofer et al. ........... 379/229 |
| 6,529,502 B2 | 3/2003 | Sarkissian et al. .......... 370/353 |
| 6,560,222 B1 | 5/2003 | Pounds et al. .............. 370/353 |
| 6,580,787 B1 | 6/2003 | Akhteruzzaman et al. ................... 379/88.22 |
| 6,587,556 B1 | 7/2003 | Judkins et al. .............. 379/219 |
| 6,625,141 B1 | 9/2003 | Glitho et al. ............... 370/352 |
| 6,633,848 B1 | 10/2003 | Johnson et al. ............. 704/277 |
| 6,658,095 B1 | 12/2003 | Yoakum et al. .......... 479/93.01 |
| 6,766,012 B1 | 7/2004 | Crossley ................ 379/265.02 |
| 6,792,085 B1 | 9/2004 | Rigaldies et al. .......... 379/88.13 |
| 6,807,254 B1 | 10/2004 | Guedalia et al. ............ 379/88.1 |
| 6,810,116 B1 | 10/2004 | Sorensen et al. ........ 379/202.01 |
| 6,816,578 B1 | 11/2004 | Kredo et al. ............... 379/88.17 |
| 6,816,589 B2 | 11/2004 | Pinard .................... 379/265.01 |
| 6,832,245 B1 | 12/2004 | Isaacs et al. ................ 709/206 |
| 6,836,480 B2 | 12/2004 | Basso et al. ................. 370/390 |
| 6,836,893 B2 | 12/2004 | Pinard ....................... 719/317 |
| 6,839,736 B1 | 1/2005 | Kajita et al. ................. 709/206 |
| 6,895,558 B1 | 5/2005 | Loveland ................... 715/746 |
| 6,904,140 B2 | 6/2005 | Trossen ................. 379/207.04 |
| 6,917,610 B1 | 7/2005 | Kung et al. ................. 370/352 |
| 6,920,208 B1 | 7/2005 | Rosen et al. ................ 379/126 |
| 6,985,576 B1 | 1/2006 | Huck .................... 379/265.09 |
| 7,003,091 B1 | 2/2006 | Burns et al. ............ 379/265.11 |
| 7,007,085 B1 | 2/2006 | Malik ........................ 709/204 |
| 7,023,980 B2 | 4/2006 | Lenard ................. 379/266.07 |
| 7,027,463 B2 | 4/2006 | Mathew et al. .............. 370/463 |
| 7,039,411 B2 | 5/2006 | Purdy et al. ................. 455/445 |
| 7,047,030 B2 | 5/2006 | Forsyth ..................... 455/518 |
| 7,062,021 B2 | 6/2006 | Starbuck et al. .......... 379/88.21 |
| 7,076,043 B2 | 7/2006 | Curbow et al. .......... 379/201.06 |
| 7,103,167 B2 | 9/2006 | Brahm et al. .......... 379/211.02 |
| 7,117,445 B2 | 10/2006 | Berger ....................... 715/752 |
| 7,180,888 B1 | 2/2007 | Crouch et al. ............... 370/352 |
| 7,184,525 B2 | 2/2007 | Arnoff et al. ............. 379/88.25 |
| 7,185,054 B1 | 2/2007 | Ludwig et al. .............. 709/204 |
| 7,187,761 B2 | 3/2007 | Bookstaff .............. 379/201.01 |
| 7,194,523 B2 | 3/2007 | Nelson et al. ............... 709/218 |
| 7,212,617 B2 | 5/2007 | Owens et al. ............. 379/93.24 |
| 7,222,156 B2 | 5/2007 | Gupta et al. ................ 709/206 |
| 7,224,774 B1 | 5/2007 | Brown et al. ............. 379/88.14 |
| 7,245,711 B2 | 7/2007 | Margolis ................ 379/209.01 |
| 7,254,641 B2 | 8/2007 | Broughton et al. .......... 709/240 |
| 7,274,778 B2 | 9/2007 | Hanson et al. ............ 379/90.01 |
| 7,286,661 B1 | 10/2007 | Balk et al. .............. 379/265.01 |
| 7,313,617 B2 | 12/2007 | Malit et al. ................. 709/225 |
| 7,334,021 B1 | 2/2008 | Fletcher ..................... 709/206 |
| 7,382,868 B2 | 6/2008 | Moore et al. ............. 379/114.01 |
| 7,424,537 B2 | 9/2008 | Bennett et al. .............. 709/227 |
| 2002/0075304 A1 | 6/2002 | Thompson et al. .......... 345/751 |
| 2002/0076025 A1 | 6/2002 | Liversidge et al. ..... 379/202.01 |
| 2002/0085701 A1 | 7/2002 | Parsons et al. ......... 379/211.01 |
| 2002/0098831 A1 | 7/2002 | Castell et al. ............... 455/413 |
| 2002/0099777 A1 | 7/2002 | Gupta et al. ................ 709/206 |
| 2002/0116461 A1 | 8/2002 | Diacakis et al. ............. 709/204 |
| 2003/0023691 A1 | 1/2003 | Knauerhase ................ 709/206 |
| 2003/0035528 A1 | 2/2003 | Baker .................... 378/207.04 |
| 2003/0037113 A1 | 2/2003 | Petrovykh .................. 709/205 |
| 2003/0041048 A1 | 2/2003 | Balasuriya ..................... 707/1 |
| 2003/0123431 A1 | 7/2003 | Geck et al. .................. 370/352 |
| 2003/0129967 A1 | 7/2003 | Verona ...................... 455/412 |
| 2003/0135569 A1 | 7/2003 | Khakoo et al. .............. 709/206 |
| 2003/0152203 A1 | 8/2003 | Berger et al. ............. 379/93.24 |
| 2003/0163819 A1 | 8/2003 | Lee et al. ...................... 725/61 |
| 2003/0174815 A1 | 9/2003 | Didcock et al. ........... 379/88.13 |
| 2003/0229722 A1 | 12/2003 | Beyda ....................... 709/310 |
| 2004/0002359 A1 | 1/2004 | Deas et al. ................ 455/556.2 |
| 2004/0054646 A1 | 3/2004 | Daniell et al. .................. 707/1 |
| 2004/0064514 A1 | 4/2004 | Daniell et al. ............... 709/206 |
| 2004/0086100 A1 | 5/2004 | Moore et al. ........... 379/201.01 |
| 2004/0141594 A1 | 7/2004 | Brunson et al. .......... 379/88.12 |
| 2004/0170263 A1 | 9/2004 | Michael et al. .......... 379/201.1 |
| 2004/0213400 A1 | 10/2004 | Golitsin et al. ......... 379/265.12 |
| 2004/0215723 A1 | 10/2004 | Chadha ..................... 709/206 |
| 2004/0240642 A1 | 12/2004 | Crandell et al. ........... 379/88.22 |
| 2004/0252679 A1 | 12/2004 | Williams et al. ............. 370/356 |
| 2004/0267871 A1 | 12/2004 | Pratley et al. ................ 709/200 |
| 2005/0013421 A1 | 1/2005 | Chavez et al. ............ 379/93.09 |
| 2005/0027867 A1 | 2/2005 | Mueller et al. .............. 709/227 |
| 2005/0041793 A1 | 2/2005 | Fulton et al. ............ 379/211.01 |
| 2005/0071241 A1 | 3/2005 | Flockhart et al. .............. 705/26 |
| 2005/0074113 A1 | 4/2005 | Mathew et al. .......... 379/265.02 |
| 2005/0080852 A1 | 4/2005 | Kelley et al. ................ 709/206 |
| 2005/0100145 A1 | 5/2005 | Spencer et al. ........... 379/88.22 |
| 2005/0201362 A1 | 9/2005 | Klein et al. ................. 370/352 |
| 2005/0213724 A1 | 9/2005 | O'Brien et al. ......... 379/202.01 |
| 2005/0220286 A1 | 10/2005 | Valdez et al. ............ 379/211.02 |
| 2005/0238157 A1 | 10/2005 | Shaffer et al. .......... 378/211.01 |
| 2005/0251555 A1 | 11/2005 | Little, II .................... 709/206 |
| 2005/0257142 A1 | 11/2005 | Lai et al. .................... 715/523 |
| 2005/0259808 A1 | 11/2005 | Andrews et al. ........ 379/265.03 |
| 2005/0275878 A1 | 12/2005 | Hiatt et al. .................. 358/1.15 |
| 2006/0002536 A1* | 1/2006 | Ambrose ............... 379/201.01 |
| 2006/0023695 A1 | 2/2006 | Yarlagadda et al. .......... 370/352 |
| 2006/0025164 A1 | 2/2006 | Wang et al. ................. 455/466 |
| 2006/0026232 A1 | 2/2006 | Malik ........................ 709/204 |
| 2006/0031510 A1 | 2/2006 | Beck et al. .................. 709/226 |
| 2006/0039545 A1 | 2/2006 | Rahman et al. ......... 379/142.01 |
| 2006/0053208 A1 | 3/2006 | Laurila et al. ................ 709/206 |
| 2006/0053225 A1 | 3/2006 | Poikselka et al. ............ 709/227 |
| 2006/0085242 A1 | 4/2006 | Mark ............................ 705/8 |
| 2006/0092970 A1 | 5/2006 | Song et al. .................. 370/466 |
| 2006/0095575 A1 | 5/2006 | Sureka et al. ................ 709/227 |
| 2006/0117098 A1 | 6/2006 | Dezonno et al. ............. 709/223 |
| 2006/0135142 A1 | 6/2006 | Repka ....................... 455/418 |
| 2006/0140176 A1 | 6/2006 | Farris et al. ................. 370/352 |
| 2006/0142012 A1 | 6/2006 | Kirchhoff et al. ............ 455/445 |
| 2006/0161632 A1 | 7/2006 | Wu et al. .................... 709/206 |
| 2006/0161872 A1 | 7/2006 | Rytivaara et al. ............ 715/864 |
| 2006/0177030 A1 | 8/2006 | Rajagopalan et al. .. 379/142.07 |
| 2006/0195585 A1 | 8/2006 | Samayamantry ............ 709/227 |
| 2006/0210047 A1 | 9/2006 | Neyman et al. .............. 379/219 |
| 2006/0252444 A1 | 11/2006 | Ozugur ....................... 379/201 |
| 2006/0256816 A1 | 11/2006 | Yarlagadda et al. .......... 370/466 |
| 2006/0265347 A1 | 11/2006 | Caballero-McCann et al. .. 707/1 |
| 2006/0276179 A1 | 12/2006 | Ghaffari et al. ............ 455/412.2 |
| 2007/0016647 A1 | 1/2007 | Gupta et al. ................ 709/207 |
| 2007/0042792 A1 | 2/2007 | Perfetto et al. .............. 455/416 |
| 2007/0058637 A1 | 3/2007 | Lo .......................... 370/395.2 |
| 2007/0101144 A1 | 5/2007 | Owen et al. ................. 713/176 |
| 2007/0124371 A1 | 5/2007 | Desai et al. ................. 709/204 |
| 2007/0130260 A1 | 6/2007 | Weintraub et al. ........... 709/204 |
| 2007/0130340 A1 | 6/2007 | Alperin et al. ............... 709/226 |
| 2007/0143433 A1 | 6/2007 | Daigle ....................... 709/207 |
| 2007/0203977 A1 | 8/2007 | Wu et al. .................... 709/203 |
| 2007/0206738 A1 | 9/2007 | Patel et al. ................ 379/93.24 |
| 2007/0271376 A1 | 11/2007 | Yach ......................... 709/224 |
| 2007/0276937 A1 | 11/2007 | Chavda et al. .............. 709/224 |
| 2008/0005239 A1 | 1/2008 | Podl .......................... 709/204 |
| 2008/0037583 A1 | 2/2008 | Dawes et al. ................ 370/467 |
| 2008/0043986 A1 | 2/2008 | Darby ..................... 379/265.09 |
| 2008/0056454 A1 | 3/2008 | Lahtiranta et al. ........... 379/67.1 |
| 2008/0059579 A1 | 3/2008 | Maes ........................ 709/209 |
| 2008/0062970 A1 | 3/2008 | Picard et al. ................ 370/352 |
| 2008/0065974 A1 | 3/2008 | Campbell ................... 715/200 |
| 2008/0075241 A1 | 3/2008 | Kent et al. ................. 379/88.12 |
| 2008/0101224 A1 | 5/2008 | Khasnabish ................ 370/230 |

| | | | | |
|---|---|---|---|---|
| 2008/0104169 | A1 | 5/2008 | Combel et al. | 709/204 |
| 2008/0148154 | A1 | 6/2008 | Burrell et al. | 715/733 |
| 2008/0155080 | A1 | 6/2008 | Marlow et al. | 709/223 |
| 2008/0212762 | A1 | 9/2008 | Gray et al. | 379/211.01 |
| 2008/0247530 | A1 | 10/2008 | Barton et al. | 379/216.01 |
| 2008/0299948 | A1 | 12/2008 | Rosener | 455/412.2 |
| 2008/0313329 | A1 | 12/2008 | Wang et al. | 709/224 |
| 2008/0320148 | A1 | 12/2008 | Capuozzo et al. | 709/227 |
| 2009/0009343 | A1 | 1/2009 | Boyer et al. | 340/573.1 |

FOREIGN PATENT DOCUMENTS

| | | |
|---|---|---|
| EP | 0 641 112 A2 | 3/1995 |
| EP | 0881802 | 12/1998 |
| EP | 1 035 718 A1 | 9/2000 |
| EP | 1499097 | 1/2005 |
| EP | 1 551 164 | 7/2005 |
| EP | 921659 | 8/2005 |
| EP | 1589733 | 10/2005 |
| EP | 1657871 | 5/2006 |
| EP | 1720330 | 11/2006 |
| JP | 5290060 | 11/1993 |
| JP | 8032618 | 2/1996 |
| JP | 2000/049851 | 2/2000 |
| JP | 2004/070752 | 3/2004 |
| JP | 2005159439 | 6/2005 |
| JP | 2006/127142 | 5/2006 |
| WO | WO 97/18661 A1 | 5/1997 |
| WO | WO 99/18697 A1 | 4/1999 |
| WO | WO 00/16207 | 3/2000 |
| WO | WO 02/50722 | 6/2002 |
| WO | WO 03/039128 | 5/2003 |
| WO | WO 2004/063854 | 7/2004 |
| WO | WO 2005/006165 | 1/2005 |
| WO | WO 2005/048121 | 5/2005 |
| WO | WO 2005/083995 | 9/2005 |
| WO | WO 2005/109844 | 11/2005 |
| WO | WO 2006/082506 | 8/2006 |
| WO | WO 2006/118651 | 11/2006 |

OTHER PUBLICATIONS

Lotus Software: "IBM Lotus Notes 6.5.1" Internet Citation, [Online] XP002361633 Retrieved from the Internet: URL:ftp:llftp.lotus.com/pub/lotusweb/product/LotusNotes651.pdf> [retrieved on Jan. 4, 2006] the whole document.

Kaplan, "Integrated messaging services in an ISDN PBX network," IEEE Conference Publication, n 288, 1988, p. 201-205, 1988. Ei Compendex® Dialog® File No. 278 Accession No. 5775289.

Bond, "An open architecture for next-generation telecommunication services [instant messaging]," C1 ACM Transactions on Internet Technology, vol. 4, Issue 1 (Feb. 2004), pp. 83-123, ISSN: 1533-5399.

Business Wire, "NEC America, Inc. and Cisco Systems, Inc. Demonstrate Feature Transparent Voice over IP PBX Networking", in Business Wire, pp. 0142, Feb. 11, 1999.

Business Wire, "Essential Communications Announces Its Highest Capacity 32-Port HIPPI Switch (with Hunt Group Definition and Troubleshooting)", Business Wire, pp. 5040233, May 4, 1998.

Caporuscio et al., "Design and evaluation of a support service for mobile, wireless publish/subscribe C4 applications [via networking and multiparty-instant messaging, electronic auctions]", Transactions on Software Engineering, IEEE Transactions, Dec. 2003, vol. 29, Issue 12, pp. 1059-1071.

Communications News, "Conversant software [networking] solves communications and productivity problems with fourth generation PBX", Communications News, vol. 22, No. 7, pp. 56, Jul. 1985.

EDGE, "Ethernet: Lucent Technologies Unveils Cajun P120 Workgroup [Hunt Group] Switch," EDGE: Work-Group Computing Report, Page: NA, Apr. 19, 1999. Gale Group PROMT®. Dialog® File No. 16 Accession No. 6279610.

EDGE1995 Ascom Timeplex unveils ST-20 . . . featuring stand-alone branching with . . . hunt-group capability for help desks (Product Announcement), in EDGE, on & about AT&T, vol. 10, No. 364, p. 37(1), Jul. 17, 1995. Gale Group Trade and Industry Database™. Dialog® File No. 148 Accession No. 8081315.

EDGE1996, "Hypercom advances migration to new WAN technologies [supporting Hunt Group and Call Negotiation]," (Product Announcement), in EDGE: Work-Group Computing Report, vol. 7, p. 19(1), Apr. 8, 1996. Gale Group Trade and Industry Database™, Dialog® File No. 148 Accession No. 8661192.

Jiang et al., "Integrating Internet telephony services [via networking, instant messaging]," Internet Computing, IEEE Publication Date: May-Jun. 2002, vol. 6, Issue: 3, pp. 64-72, ISSN: 1089-7801. Digital Object Identifier: 10.1109/MIC.2002.1 003133. Posted online: Aug. 7, 2002 00:52:07.0.

Ludwig, "Integration of CAD/CAE with multimedia teleconferencing and messaging via broadband networks and shared resource servers," Systems Integration, 1990. Systems Integration '90., Proceedings of the First International Conference, Date: Apr. 23-26, 1990, pp. 136-143.

Milstead, et al., "The digital PBX: current and future views of applications for [networking] information management," Conference on Private Switching Systems and Networks, 1988, Publication Date: Jun. 21-23, 1988, pp. 93-98, INSPEC Accession No. 3239158, Posted online: Aug. 6, 2002 15:56:19.0.

PBI2005, "ShoreTel Releases New Capabilities for Distributed Enterprises and International Offices C13 [with Hunt Group and Unified Messaging]," in PBI—Telecomtactics Insider, Feb. 15, 2005. World Reporter. Dialog® File No. 20 Accession No. 40684664.

PR Newswire, "Inter-Tel Announces Small-Office IP . . . [with PBX Hunt Group] Networking System," in PR Newswire, Jun. 22, 2000. World Reporter. Dialog® File No. 20 Accession No. 11618675.

PR Newswire 2002, "New VNCI Video Technology Delivers Maximum Efficiency and Connectivity [with Circular Hunt Group Technology]," PR Newswire, p. NETU01605032002, Mar. 5, 2002. Gale Group PROMT® Dialog® File No. 16 Accession No. 9490114.

Yin, "Voice menu navigation . . . with [instant messaging] cross-device user experience integration," Symposium on User Interface Software and Technology, Proceedings of the 18th annual ACM symposium on User interface software and technology, pp. 187-190 (2005) ISBN:159593-271-2.

International Search Report for PCT/US2008/054704.
International Search Report for PCT/US2008/054699.
International Search Report for PCT/US2008/055130.
International Search Report for PCT/US2008/063914.
International Search Report for PCT/US2008/054738.
International Search Report for PCT/US2008/62250.

Vijay K.Gurbani and Xian-He Sun, Article from the 2004 Global Telecommunications Conference Entitled: "Extensions To An Internet Signaling Protocol To Support Telecommunication Services", pp. 1640-1643, published Dec. 2004.

International Search Report & Written Opinion PCT/US08/63921 dated May 19, 2009.

International Search Report & Written Opinion PCT/US08/63941 dated Feb. 18, 2009.

Kellogg S. Booth et al., The "Mighty Mouse" Multi-Screen Collaboration Tool; ACM; 1-57113; vol. 4, Issue 2, pp. 209-212 (2002).

Office Action Summary date May 19, 2009 for U.S. Appl. No. 11/749,631, filed May 16, 2007.

Office Action Summary for Applications Under Accelerated Examination dated Jul. 1, 2009 for U.S. Appl. No. 12/247,910, filed Nov. 8, 2008.

Office Action Summary for Applications Under Accelerated Examination dated Jul. 6, 2009 for U.S. Appl. No. 12/247,949, filed Nov. 8, 2008.

Office Action Summary date Jul. 2, 2009 for U.S. Appl. No. 11/749,657, filed May 16, 2007.

* cited by examiner

| | E-mail | IM | Address Book/Directory | PBX | Data Store | Calendar/Tasks | File Manager |
|---|---|---|---|---|---|---|---|
| E-mail | XXXX | User can reply to e-mail via IM, also used to send internal notifications and get presence information | Used to authenticate and authorize users, store and modify mail list and mail rules, user can initiate e-mail from the address book | User can reply to e-mail via phone call | Stores internal metadata and message data | User can generate Task or Event from e-mail | User can store attachment in the file store |
| IM | Stores history data as e-mail messages, user can reply to IM via e-mail | XXXX | Used to authenticate and authorize users, keep roster, presence and subscription information, user can initiate IM from the address book | User can reply to IM via phone call | Stores internal metadata and message data | User can generate Task or Event from IM or IM history | User can share, send and receive files |
| Address Book/Directory | | Used to send notification and updated address card information | XXX | | Used to store directory/address book data and internal metadata | | |
| PBX | Used to distribute, store and access voicemail, recorded calls and call history, user can forward recorded calls, voicemail and call history events via e-mail or reply via e-mail to phone call | Used for phone control mechanism, used for hunt group management, user can reply to phone call via IM | Used to authenticate and authorize users, user can initiate call from the address book | XXXX | Used to store call routing information, internal technical data | Used to manage advanced call distribution (i.e. schedule dependant call forwarding etc.) | |
| Data Store | | | | | XXXX | | |
| Calendar/Tasks | Used to send invitations and tasks, user can generate e-mail from calendar event or task, used for event and/or task notification | User can generate IM from calendar event or task, used for event and/or task notification | Used to authenticate and authorize users, user can invite others to event or assign task based on address book | Used for event and/or task notification | Stores calendar and task data, access lists and internal metadata | | |
| File Manager | User can share files via e-mail, used for sharing invitations | User can share files via IM, used for internal notifications | Used to authenticate and authorize users, store access lists | | Used to store data | | XXXX |

FIG.2

SYSTEMS AND METHODS FOR PROVIDING UNIFIED COLLABORATION SYSTEMS WITH COMBINED COMMUNICATION LOG

CROSS-REFERENCE TO RELATED APPLICATIONS

The present application is a continuation of U.S. patent application Ser. No. 11/749,642 filed on May 16, 2007, entitled "Systems And Methods For Providing Unified Collaboration Systems With Combined Communication Log," which is hereby incorporated by reference in its entirety.

The present application is related to U.S. patent application Ser. No. 11/749,631 filed on May 16, 2007, entitled "Systems And Methods For Providing Unified Collaboration Systems With User Selectable Reply Format" and U.S. patent application Ser. No. 11/749,657 filed on May 16, 2007, entitled "Systems And Methods For Providing Unified Collaboration Systems With Conditional Communication Handling," which are hereby incorporated by reference in their entirety.

This application is related to U.S. patent application entitled, "Systems and Methods for Providing Unified Collaboration Systems with User Selectable Reply Format" and U.S. patent application entitled, "Systems and Methods for Providing Unified Collaboration Systems with Conditional Communication Handling" filed on the same date as the present application. These applications are incorporated herein by reference in their entirety.

BACKGROUND OF THE INVENTION

This application relates to communication and in particular relates to integration of existing communication formats in a manner that provides additional functionality to a user.

Various communication formats are commonly used for electronic communication. In particular, email and instant messenger formats are commonly used for communication through a personal computer (PC) or other device. Telephone communication is generally performed using a dedicated telephone device (desktop telephone, cell phone, or other device). In some cases Voice over Internet Protocol (VoIP) may allow telephone communication using a PC or similar device. VoIP may also use dedicated hardware such as a desktop IP phone or cell phone. Generally, some additional hardware is needed to use a PC in this way (e.g. an IP handset). Email, instant messenger and telephone communication, where they are provided on a single PC, are often provided by different applications. Such applications use different address books and maintain different communication logs. Thus, when communication between two or more people takes place using different communication formats, responding may require consulting the right address book and sometimes copying and pasting an address to another application, or even manually entering address information. When reviewing past correspondence, two or more different logs may need to be reviewed in order to see the full details of correspondence. Such logs may be reviewed entry-by-entry to determine the order in which individual communications occurred (e.g. from time stamp information). Separate communication formats generally require separate configuration. For example, a user may have an email account set up on an email server and separately have a telephone account set up on a telephone server. Thus, providing and maintaining multiple communications systems is inefficient and often inconvenient.

SUMMARY OF THE INVENTION

In one embodiment, a communication system provides integration between different communication formats including email, telephone and instant messenger. A common address book may be used that includes information for communicating by each communication format. A user can initiate communication according to any communication format from the address book. A common communication log may be maintained that includes communication according to each communication format. When a communication is received according to one of the communication formats, the user may initiate a reply according to any communication format using a single command. Presence information may be shared and used to manage communication according to different formats. Where presence information is obtained from instant messenger communication, this information may be used to select an email management scheme and a telephone management scheme.

A goal of the present invention is provide methods, systems, and apparatus for unified collaboration systems. The provided unified collaboration systems include address books (directories), e-mail services, instant messaging and presence services with gateways to external systems, phone services (including PBX), calendaring, scheduling and file sharing for corporate or private users. Access to each and all components of the system may be based on access policy determined by the system administrator(s).

Headings are used herein for clarity only and without any intended limitation. A number of references are cited herein, the entire disclosures of which are incorporated herein, in their entirety, by reference for all purposes. Further, none of the cited references, regardless of how characterized above, is admitted as prior to the invention of the subject matter claimed herein.

This invention also includes software products implementing the methods of this invention. Hardware systems variously configured to perform the methods of this invention are also included.

BRIEF DESCRIPTION OF THE DRAWINGS

FIG. 2 illustrates certain relationships between components of FIG. 1.

DETAIL DESCRIPTION OF THE PREFERRED EMBODIMENTS

Figure 1:
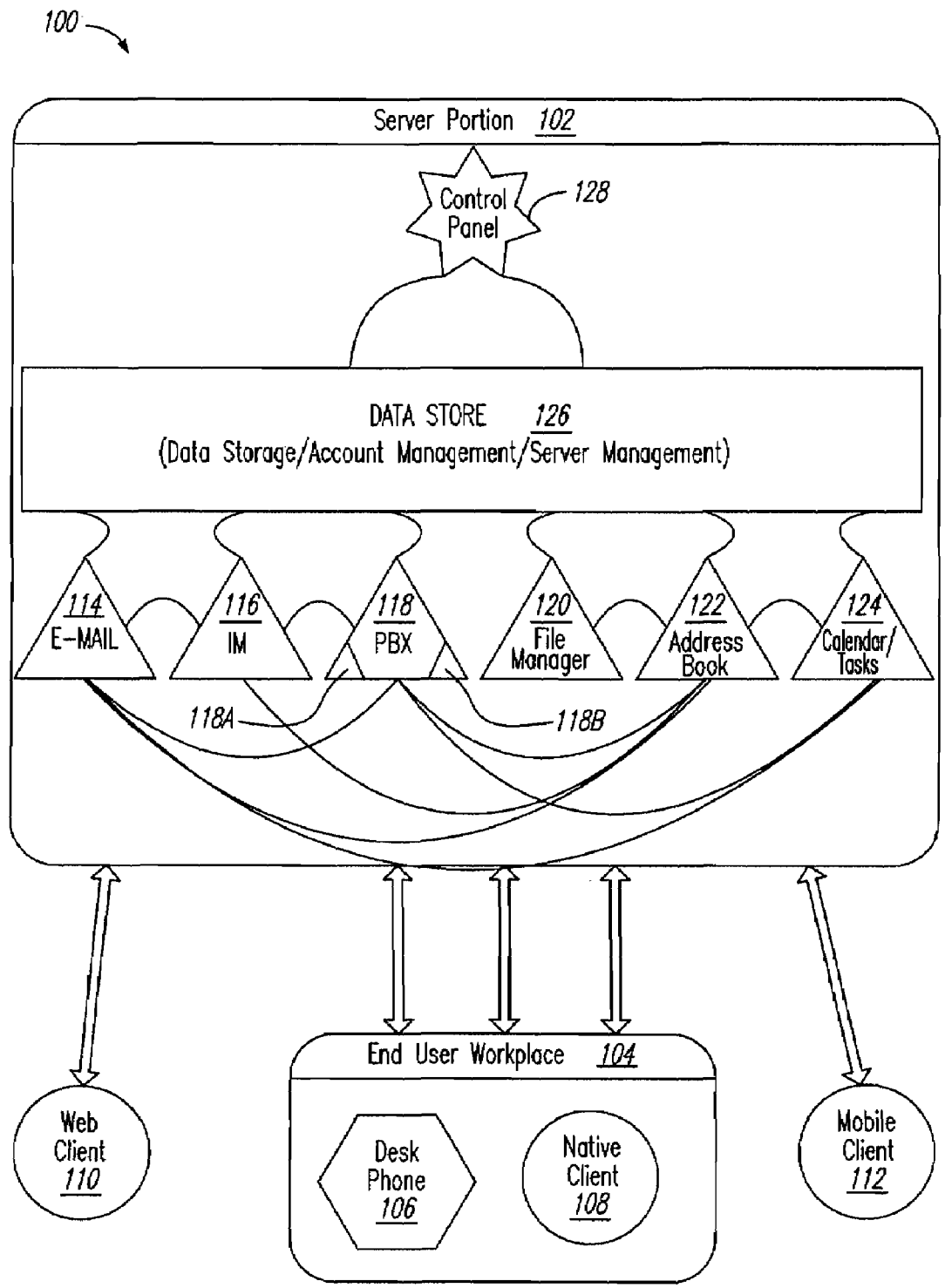
FIG. 1 illustrates a system organization according to an embodiment of the present invention.

FIG. 1 shows a simplified view of a communications system 100 according to an embodiment of the present invention. Communication system 100 includes a server portion 102 that is used in communication with one or more client agents. An end user workplace 104 is connected to server portion 102 so that communication to and from the end user workplace 104 passes through server portion 102. End user workplace 104 includes a desk phone 106 and a native client 108. Native client 108 may be considered as an example of a client agent. Native client 108 in the present example is an application running on a PC. In general, multiple end user workplaces are connected to a server portion. For example, a business may provide end user workplaces to its employees, with each employee having a desk phone and a PC that includes a native client. In addition, some employees may work remotely and may maintain communication through a web client such as web client 110. Other employees may remain in communication through a mobile client such as a PDA, laptop with WiFi or a blackberry (e.g. mobile client 112). Web clients and mobile clients may be considered as different types of client agents.

Server portion 102 of communication system 100 may consist of software on a single hardware platform or may consist of software extending over several hardware platforms. The term "server" is generally used to describe software that performs server functions in relation to a client (such as native client of FIG. 1) and is not limited to any particular hardware configuration, though in some cases a server may operate on a dedicated hardware platform (sometimes also referred to as a server). In one example, a server portion consists of several software servers on a single hardware platform, each server performing a different function. In the present example, server portion 102 includes an email server 114, an instant messenger (IM) server 116, a Private Branch Exchange (PBX) server 118, a file manager server 120, an address book server 122 and a calendar/task server 124. Other servers may also be provided in some cases. The servers are operated in an integrated manner to provide a user with integrated communication capability.

An email server, such as email server 114, may include computer hardware and software having a front end module ("FEM"), a mail access module ("MAM"), a data exchange module, a client notification module ("CNM"), a mail transfer module ("MTM"), a mail processing module ("MPM"), and an authentication and authorization module. A mail-transfer agent includes computer hardware and software having a mail transfer module, a data exchange module, a mail processing module, and an authentication and authorization module. Email communications that a user sends from native client 108 pass through email server 114 and are directed to their recipients. Email communications may be received from other native clients or from other servers (which may be outside the server portion). Any such email communications that are addressed to the user are sent to native client 108 by email server 114.

When an e-mail message arrives at communication system 100, a mail-transfer agent receives it, validates message credentials against data stored in dedicated-distributed data store 126, checks the message for viruses, checks whether or not the message falls into one or more white/black lists, and then either deletes it, puts into recipient(s) mailbox, or sends it to another internal or external mail-transfer agents for further processing. Mail-transfer agents can serve one or multiple domains, and can replace, alternate, add or delete any or all message headers based on rules retrieved from the dedicated-distributed data store.

Email-access servers may support IMAP and POP protocols and provide access for clients agents (e.g. native client) to e-mail messages stored in a data store using these protocols. The Email-access servers can provide server side search and indexing features for stored messages. Each mailbox can have one or multiple owners, or be shared by an owner with others people based on access list. Email-access servers may support shared folders.

An instant-messaging server, such as instant messenger server 116, may include computer hardware and software having a data exchange module, a message handling module ("MHM"), an authentication and authorization module, one or several messenger gateway modules ("MGM"), and a presence manager module ("PMM"). In the present example, the instant messenger maintains presence information for all system users. The presence information is generally maintained by assigning the user a particular presence state such as "busy," "away," "free," or "do not disturb." The state used may be selected by the user or may be assigned based on the location of the user as inferred from the user's activities (or lack of activities) on the PC or desk phone. Instant-messaging servers may support XMPP protocol or other similar protocol, and provide gateways to external instant messenger systems and networks including but not limited to ICQ™, AIM™, MSN™ and Jabber™. When a new instant message arrives, the client agent displays a notification to the end user. Client computers may store local copies of all or some instant messages and all or some address books so that they can be available for off-line usage. Client computers can automatically checks for updates of software, messages and address book(s), e.g., each time it goes online. An instant message generally includes the sender's signature and is uniquely identifiable.

A Private Branch Exchange (PBX) server, such as PBX server 118, directs telephone communication to and from end users. For example, incoming calls having call information indicating a user's extension may be sent by the PBX to the user's desk phone. Outgoing calls from the desk phone are directed according to the number dialed. The PBX provides additional functions including call forwarding and conference calling. A PBX may include a call-routing-and-registration server. A call-routing-and-registration server includes computer hardware and software having a call routing module ("CRM"), a data exchange module, phone registration module ("PRM"), an authentication and authorization module, a phone registration module, and a messaging module.

In addition, a PBX server may include a voicemail server (not shown) to provide voicemail services to users. A voicemail server includes computer hardware and software having an interactive voice response module, a call processing module, a data exchange module, a mail access module, mail transfer module, a messaging module, and an authentication and authorization module. A voice-mail server includes computer hardware and software having a data exchange module, a mobile data exchange module ("MDE"), and an authentication and authorization module.

In some examples, a PBX server may include a hunt-group server to a hunt-group server (not shown). A hunt-group server includes computer hardware ("CH") and software having an interactive voice response ("IVR") module, a call processing module ("CPM"), a data exchange module ("DEM"), a hunt group process module ("HGM"), a messaging module ("MM"), and an authentication and authorization module ("AAM").

PBX server 118 receives and sends phone calls from and to client phones, phone gateways, or other devices such as, e.g., voice-mail servers or hunt-group servers using the call-routing-and-registration servers. Call-routing-and-registration servers retrieve phone call related information from dedicated-distributed data store (data store) 126, send notifications to client computers using instant-messaging servers, and route and connect phone calls based on the information from the dedicated-distributed data store and on commands received from the client computers, client phones and/or phone gateways (see the corresponding patent application). PBX's provides typical known functionality including but not limited to hunt groups ("HG"), automatic call distribution, call waiting, caller id etc. Hunt group management and call distribution may be done based on instant-messaging servers presence information.

It should be noted that PBX server 118 may operate with legacy phone hardware (POTS systems) and is not limited to working with VoIP type communication. This has the advantage that new phone hardware (such as a new handset) is not required.

A file manager server, such as file manager server 120, provides access to data files stored in the data store. A file manager may include computer hardware and software having a data access module ("DAM"), an authentication and authorization module, and a data exchange module. In general, data associated with various communication formats may be stored in the data store and may be retrieved from the data store using the file manager server.

An address book server, such as address book server 122, maintains an address book so that requests for address information are directed to the address book server. Also, updating of address information is done through the address book server. In the present example, the address book contains entries that have email, telephone and instant messenger information for individuals. Thus, the address book can be used for various communication formats including email, telephone and instant messenger.

A calendar/tasks server, such as calendar server 124, maintains a calendar so that requests for calendar information are directed to the calendar/tasks server and updates of the calendar are performed through the calendar/tasks server. Client agents provide the ability to select people from the address book to be displayed in the instant messenger roster (presence information). It includes both internal users of the system and external contacts such as for example ICQ™ users. Users of different instant messaging systems are marked with different presence icons in the roster. Users can group entries in a roster in any desired way. A client agent also can provide the ability to create chat rooms, invite people to chat rooms, and make chat rooms public or private. They can also provide the ability to make the user visible or invisible to one, several or all other users. They can also display counterpart activity during the conversation.

A dedicated-distributed data store (data store), such as data store 126, includes data storage hardware which could be computer hard drive, flash drive, network addressable storage ("NAS"), Sun Inc. or other vendor data stores, any other data storage device and data management software i.e. data-base management system, file system, etc. Account management and server management information may be stored in the data store.

The above mentioned servers could utilize the same physical computer hardware or different physical computer hardware that can be installed in one or several locations. Any of the above mentioned servers could be installed alone or together with any other servers (i.e. share or not share the same computer). In case of a distributed installation, i.e. on several different computers, each server should be able to access all other servers in the system using, for example an IP-based protocol.

Corresponding to the servers shown, native client 108 performs various functions including communicating by email, instant messenger and telephone, accessing files, address information and calendar information. In this example, these functions are carried out using a single application which presents the user with communication options in a single integrated manner. Thus, communication according to different formats including email, telephone and instant messenger are integrated in a way such that a user can switch from one format to another without switching from application to application. Several advantages may be achieved by such integration.

Certain resources may be shared between different communication formats that in prior systems generally required separate resources. For example, a common address book may be maintained for email, telephone and instant messenger communication (and other formats also, if provided). Thus, when an entry is found in the address book, a user has a choice of contacting the person in at least three different ways. These options may be provided so that a user can select an option by a single command, such as a single mouse-click, a single key stroke or a drag and drop operation (e.g. dragging a person's name to a particular screen location). Also, when the user receives a communication according to any of these formats, a reply may be initiated according to any of the formats with a single command. For example, where the user receives an email from someone in the address book, the user may reply by email, telephone or instant messenger. Selecting a telephone reply may cause a call to be placed by the native client, through the PBX. Similarly, when an instant messenger communication is received, a reply may be sent by email, telephone or instant messenger. When a telephone communication (telephone call or voicemail) is received, a reply may be by telephone, email or instant messenger. The User Interface (UI) of native client 108 may present these options on a visual display so that the user can select any one of them with a single command (e.g. a single mouse-click or a single key stroke).

Because communication in such an integrated communication system may include multiple formats, it may be convenient to integrate histories of such communication in a single log. A common communication log may be maintained that includes email, telephone and instant messenger communication. Thus, a user who wishes to review his correspondence with an individual can view, in a single list, all communications with that individual including email, telephone and instant messenger communication.

Management of communication with a user may be integrated so that information gained from one communication format is used to manage other communication formats. Presence information obtained from instant messenger communication may be shared and used to select an appropriate management scheme for other communications also. For example, where instant messenger communication indicates a presence state of "away," a user's telephone calls may be forwarded to the user's cell phone or to voicemail. The user's email may be sent to another location or to a mobile device such as a blackberry or PDA.

Management of a user's accounts may also be integrated so that instead of separately setting up an email account, an instant messenger account and a telephone account, a single configuration automatically provides all three. FIG. 1 shows a single control panel 128 for controlling server management including control of email server 114, instant messenger server 116, PBX server 118, file manager server 120, address book server 122 and calendar/tasks server 124. Control panel 128 allows a user to be given an integrated account that provides email, telephone and instant messenger communications. Authorization, authentication and accounting may be performed together for all communication formats. The user's access privileges may also be configured through the control panel so that the user does not necessarily have access to all communication formats, or to all stored files.

In order to provide an integrated communication system, the servers shown communicate with each other and with native client 108. Communications between components may or may not be encrypted according the level of security that is desired. Some of the main interactions between components are summarized in the table of FIG. 2. Each row shows how the components listed in the column headings support the component of the specified row. For example, the first row deals with email and how other components interact with email to provide greater integration. The following description of relationships between components follows the table of FIG. 1.

Email

Email provides an option to reply by instant messenger (also telephone) and instant messenger may be used by the email component to send internal notifications and to obtain presence information. For example, presence information provided by the instant messenger system may be used to select a management scheme for dealing with incoming emails.

Email server 114 uses the address book/directory to authenticate and authorize users. Email server 114 also provides the user with the ability to store and modify mail lists and mail rules that are stored in the address book. Email server 114 provides the user with the ability to initiate an email from the address book, for example by clicking (or double clicking) the email address within an entry in the address book.

The email component of native client 108 provides the option of replying to an email by telephone. In one example, a typical "reply" button that is provided when an email is displayed is replaced with three buttons, "reply email," "reply IM" and "reply by phone." Alternatively, these options may be provided in a drop-down menu or otherwise.

Email server 114 uses the data store to store metadata associated with email communications and to store message data.

A user can use the email component of native client 108 to generate tasks or events in the calendar.

A user can use the email component of native client 108 to store attachments that are received with incoming emails using the file manager Instant Messenger Instant messenger messages may be stored as emails within a common log. Thus, email may be chosen as a common format for storage, though in other cases a different format may be chosen. A user can reply to an instant messenger with an email (generally, using a single command).

The instant messenger server 116 may refer to the address book, through the address book server, to authenticate users and to keep roster, presence and subscription information.

The user can initiate an instant message from the address book, for example by clicking on the IM portion of a persons address book entry.

When a user receives an instant messenger message, they can respond via a phone call.

Internal metadata associated with instant messenger messages and also message data are stored in data store 126. Each conversation using instant messaging server 116 can be stored based on number of preset rules (such as timeout, topic etc) in same way e-mail is stored, and can be displayed in separate folder in the client's agent in a way that end users of the system would have access to their instant message history similarly to the way to e-mail is accessed, i.e. with ability to search, sort etc.

A user can generate a calendar task or event from instant messenger or from instant messenger history.

A user can share send and receive files through instant messenger. Such files are sent to or from the file manager.

Address Book/Directory

Address book server 122 uses instant messenger to send updated notification and address card information. The address book data are stored in the data store 126. The user list, access control list, address book(s) and internal metadata associated with the address book(s) are stored in the data store 126, so that they can be retrieved by clients agents or other system components via the data-access-servers using one or a combination of data access protocols ("DAP").

PBX

PBX server 118 uses email to distribute, store and access voicemail, recorded calls and call history. Thus, a user can forward recorded calls, voicemail and call history events via email or reply via email to a phone call. This gives a user the ability to distribute a voicemail or call history to a wide group.

PBX server 118 uses instant messenger for a telephone control mechanism used for hunt group management. A user can reply to a telephone call by instant messenger (or email).

PBX server 118 uses the data store to store call routing information and internal technical data. Voice-mail messages are stored in the dedicated-distributed data store in a fashion similar to the way e-mail messages are stored. Voice-mail servers can retrieve voice mail messages via email-access servers, and send then using the mail transfer module. Client computer and/or mobile-client software can access voice-mail messages via email-access servers. Email-access servers can perform same operations with voice-mail messages as with e-mail messages or archived instant messages.

PBX server 118 uses the calendar of calendar server 124 to manage advanced call distribution such as schedule dependent call forwarding. For example, if a call is received for an individual, the PBX server may determine from the calendar that the person is on vacation and redirect the call to another individual.

Calendar/Tasks

Calendar server 124 uses email to send invitations and tasks. For example invitations to a meeting may be sent by email to all those invited to attend. A user can generate email from a calendar event or task to provide notification of the event or task.

Instant messenger communications may also be generated from a calendar event or task so that the communication is used for event or task notification.

Calendar server 124 may use the address book to authenticate and authorize users. Calendar server 124 can invite individuals to an event or assign tasks to individuals based on information in the address book.

Calendar server 124 may use the PBX server for event or task notification.

Calendar data, task data, access lists and internal metadata may all be stored in data store 126 so that they are accessible by client computers and/or mobile-client software via the data-access-servers and/or the email-access servers. Client computer and/or mobile-client software can keep local copies of calendar events and tasks for off line usage.

File Manager

Files may be shared by sending email invitations to recipients who then access the shared file through file manager server 120.

Files may also be shared by sending IM invitations to recipients who then access the shared file through file manager server 120.

The address book of address book server 122 may be used to authenticate users who are attempting to access shared files through file manager server 120.

File manager server 120 uses the data store to store files. Client computer and/or mobile-client software have access via file-sharing servers to the computer files stored in data store 126, and can synchronize files across several computers or mobile devices which belong to one person or group. Groups can be defined based on access list stored in dedicated-distributed data store and retrieved by file-sharing servers during authorization process via data-access-servers.

The above listing is not intended to be an exhaustive list of all interactions between components. Other interactions may also occur.

A User Interface (UI) provided to a user by the native client may be implemented in a number of ways. Some examples of possible UI formats are shown in FIGS. 3-5, however different formats may also be used to provide the same functionality or additional functionality to a user.

Figure 3:
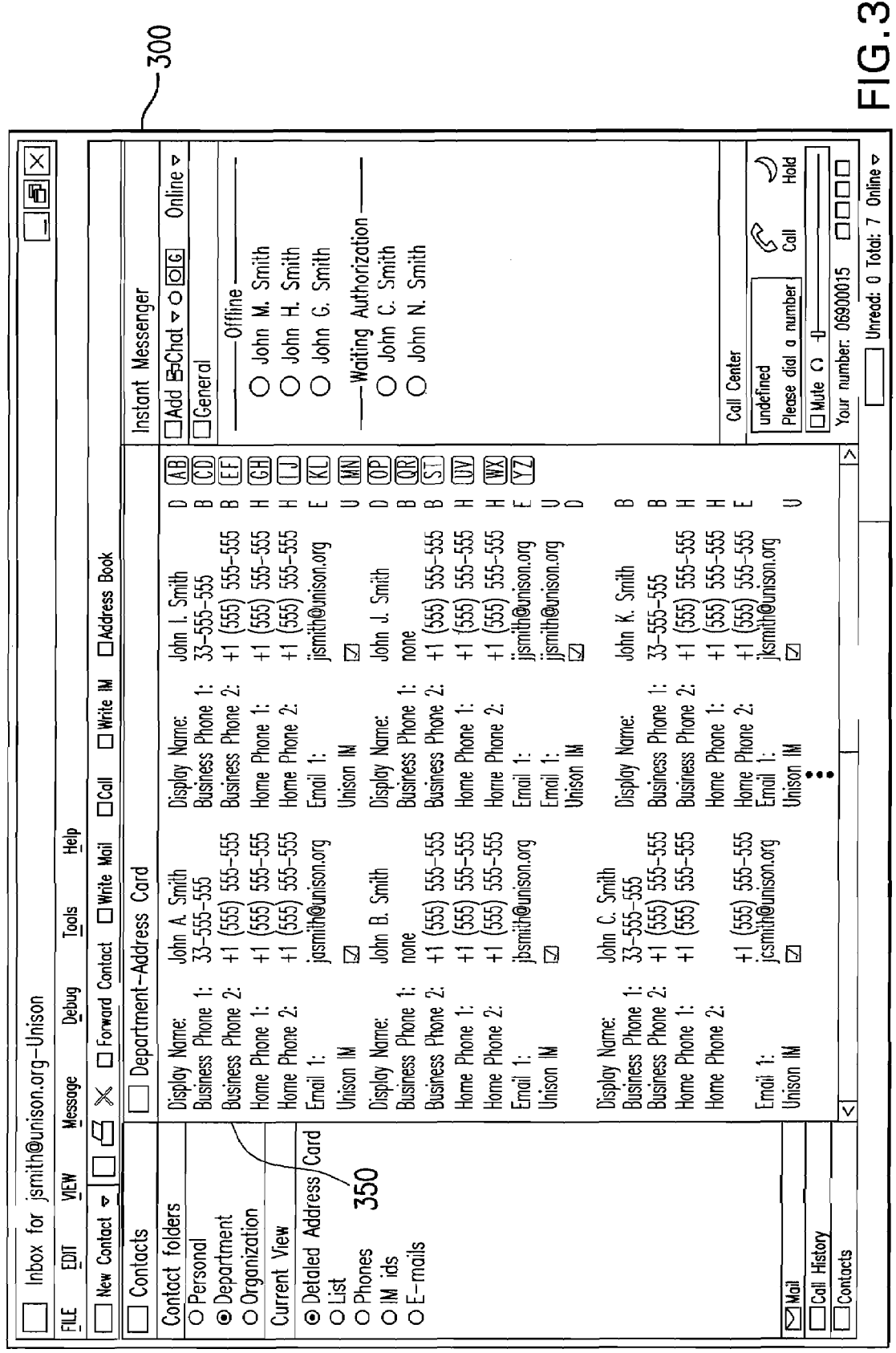
FIG. 3 illustrates a common address book with an entry that contains telephone, email and instant messenger address information for an individual.

FIG. 3 shows a screenshot of a display provided to a user by a native client. The screenshot shows a common address book that contains entries for employees of a business. Each entry gives telephone, email and instant messenger information for the employee. For example, the highlighted entry 350 shows two business phone numbers, two home phone numbers, an email address and an instant messenger option. A telephone call to any one of the employee's telephone numbers may be initiated by clicking on the telephone number in the employee's entry. Similarly, an email may be initiated by clicking on the employee's email address. An instant message to the employee may be initiated by clicking on the Unisom IM option in the employee's entry. Thus, the common address book allows communication with a person listed in the address book by telephone, email or instant messenger, and any one of these communications may be initiated by a single command without having to open another application or cut and paste an address from elsewhere.

Figure 4:
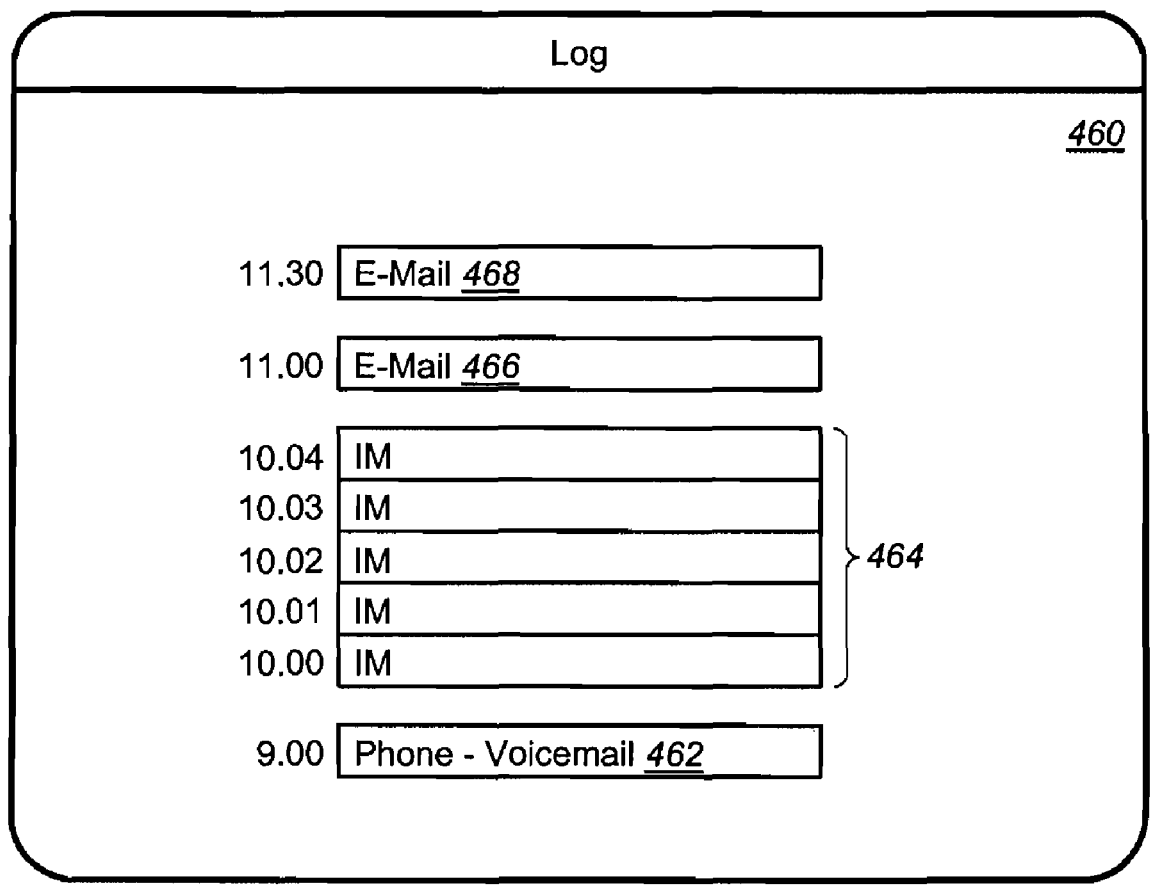
FIG. 4 illustrates a common communication log that includes telephone, instant messenger and email communication history.
Figure 5:
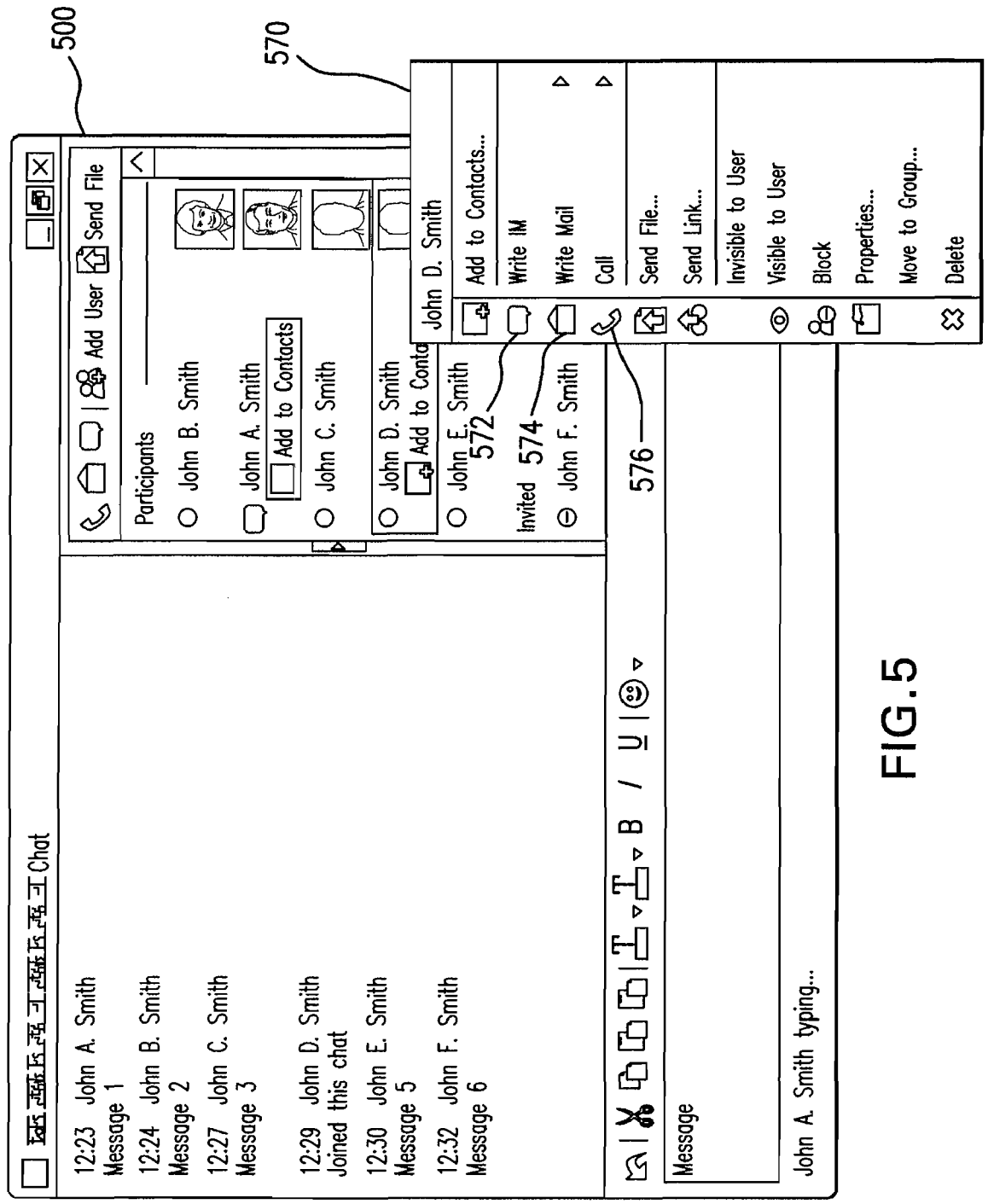
FIG. 5 illustrates an instant messenger session display that provides options to respond to participants by email or telephone in addition to instant messenger.

FIG. 4 shows an example of a common log 460 that contains a record of communication according to three different communication formats. In general, a log may be sorted according to different parameters. A common log may contain all communications according to all communication formats. For example, the log may include a telephone communication history for both telephone conversations that were terminated in a client device and a telephone. A common log may be sorted to be in chronological order or by name. In the present example, common log 460 is searched to show only correspondence between the user and a particular contact in the address book on a particular day. Common log 460 includes a telephone communication 462 (a voicemail) at 9.00. This is followed by an instant messenger exchange 464 starting at 10.00, a telephone call 466 at 11.00 and an email 468 at 11.30. Thus, a complete record of correspondence with this contact is provided to the user on one page. While the example of FIG. 4 shows email, instant messenger and telephone communication, a user may choose to show only one of these communication formats, or may choose to show two of these formats but not the third.

In one embodiment, a user can configure the system to store the content of the communication in addition to the communication record. For example, the user may configure the PBX to store all his or her telephone conversation automatically in the data store. Alternatively, the users may initiate a recording of a conversation on demand. This may involve selecting a recording button on the user display to begin recording the conversation and selecting of the same button or another button to stop recording. Generally, the content of such recording may be available through the log.

A user may create, modify, or eliminate one or more tags associated with a communication record in the log for further identification or classification. For instance, the user may choose to add subject title to telephone conversations where one did not exist before or modify a system generated subject title. This will enable the user to sort her or his telephone conversation by user defined subject title in addition to any other tags that may have been generated automatically by the system. Thus, allowing, for example, the user to search through telephone conversation recordings tags quickly and conveniently.

FIG. 5 shows an example of instant messenger communication that includes the option to respond by email or telephone. In particular, any individual that is listed as a participant in the instant messenger session may be selected and a pop-up menu provides the option to email or telephone this individual. The screenshot of FIG. 5 shows a pop-up menu 570 associated with a participant in an IM discussion. The pop-up menu includes an option 572 to initiate an instant message, another option 574 to initiate an email and yet another option 576 to initiate a phone call to reply. The common log would retain a record of such communication so that a clear record of correspondence via multiple communication formats is available.

Figure 6:
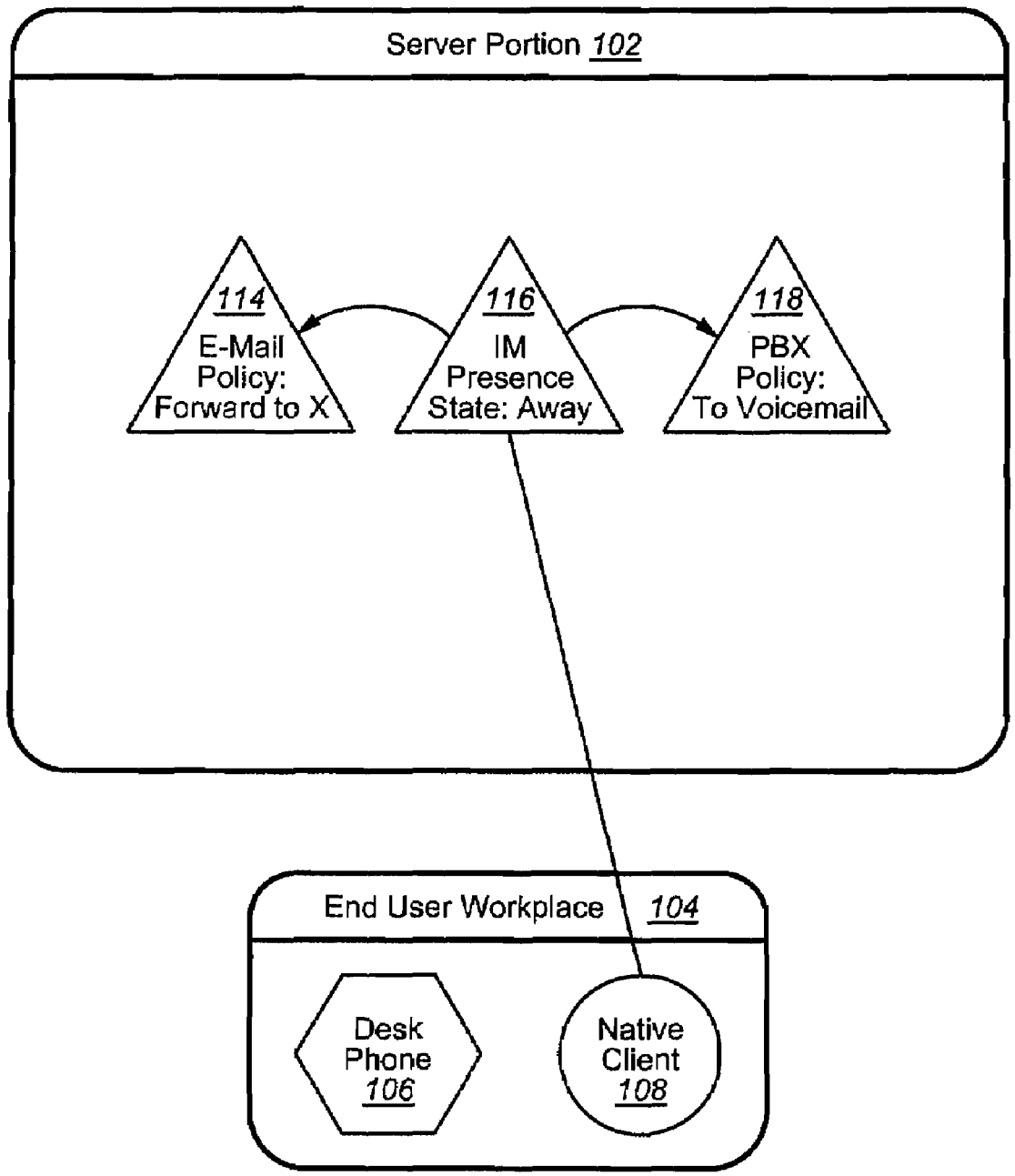
FIG. 6 illustrates sharing of presence information between an instant messenger server, email server and PBX server so that email and telephone communication are managed according to presence information obtained from instant messenger communication.

Sharing of presence information in the present system is achieved using instant messenger communication as shown in FIG. 6. In particular, email server 114 and PBX server 116 may obtain presence information regarding the user from instant messenger server 116. This information may be maintained by instant messenger server 116, or instant messenger server 116 may request presence information from native client 108 when the instant messenger server 116 receives a request for this information. Email server 114 may have alternative email handling schemes that are selected according to presence information received from instant messenger server 116. Generally, presence information is provided as a presence state. A user is assigned a presence state from a finite list of presence states at all times. The list of presence states may be user defined or some default scheme. When an email is received by email server 114, email server 114 may check the presence state of the user. In FIG. 6, the user has a presence state that indicates that the user is away. In response to determining that the user's presence state is "away," email server 114 may choose a scheme that includes forwarding the email to another address (for example, another employee who is covering for the absent user). Email server 114 may also send a reply to the email indicating that the user is away. These options may be configured by the user so that email is directed as the user requests for various presence states. Similarly, PBX server 118 may have various schemes for dealing with telephone communication (both duplex telephone calls and voicemail). An appropriate scheme may be chosen according to presence information obtained from instant messenger server 116. Where the user's presence state is "away," PBX server 118 may send incoming calls to voicemail as shown, or may forward the calls to another user or to a cell phone. Thus, presence information obtained by instant messenger is used to manage communication according to other communication formats also.

The embodiments of the invention described above do not limit the scope of the invention, since these embodiments are illustrations of several preferred aspects of the invention. Any equivalent embodiments are intended to be within the scope of this invention. Indeed, various modifications of the invention in addition to those shown and described herein, such as alternate useful combinations of the elements described, will become apparent to those skilled in the art from the subsequent description. Such modifications are also intended to fall within the scope of the appended claims. In the following (and in the application as a whole), headings and legends are used for clarity and convenience only.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims.

What is claimed is:

1. A communication system for email and telephone communication comprising:
    an email server that exchanges email communication with a client device;
    an instant messenger server that exchanges instant messenger communication with the client device;
    a Private Branch Exchange (PBX) server in communication with the client device, the PBX server also in communication with a telephone, the PBX server providing an indication of an incoming telephone call to both the client device and the telephone; and
    wherein when a communication is received according to any one of the plurality of communication formats, an application operating on the client device causes an indication of the communication to be presented to a user and also causes a plurality of reply options to be presented to the user, the plurality of reply options including creating a reply according to any one of the plurality of communication formats, each of the plurality of reply options selectable by a single command;
    wherein the communication system provides a combined log of email communication history, instant messenger communication history and telephone communication history, the telephone communication history including telephone communication with the PBX through the client device and telephone communication with the PBX through the telephone.

2. The communication system of claim 1 wherein the telephone is a legacy telephone or an Internet Protocol telephone.

3. The communication system of claim 1 further comprising a calendar server and an address book server, the address book server maintaining an address book that has a plurality of entries, an individual entry containing email, telephone and instant messenger address information.

4. The communication system of claim 3 wherein the address book server provides user access information to the client device.

5. A method for email and telephone communication comprising:
    exchanging email communication with an email server;
    exchanging instant messenger communication with an instant messenger server;
    communicating with a Private Branch Exchange (PBX) server via a client device and a telephone,
    receiving a communication according to any one of the plurality of communication formats;
    presenting an indication of the communication, including presenting an indication of an incoming telephone call from the PBX server via the client device and the telephone;
    presenting a plurality of reply options to the communication according to any one of the plurality of communication formats, each of the plurality of reply options selectable by a single command; and
    providing a combined log of email communication history, instant messenger communication history and telephone communication history, the telephone communication history including telephone communication with the PBX through the client device and telephone communication with the PBX through the telephone.

6. The method of claim 5 wherein the telephone is a legacy telephone or an Internet Protocol telephone.

7. The method of claim 5 further comprising accessing an address book on an address book server that has a plurality of entries, an individual entry containing email, telephone and instant messenger address information.

8. The method of claim 7 wherein the address book server provides user access information to the client device.

* * * * *